(12) United States Patent
Day et al.

(10) Patent No.: US 12,110,625 B2
(45) Date of Patent: Oct. 8, 2024

(54) CREEL WITH INTEGRATED YARN DELIVERY AND CONTROL SYSTEM

(71) Applicant: Tuftco Corporation, Chattanooga, TN (US)

(72) Inventors: Shannon Day, Chattanooga, TN (US); Jeff Smith, Chattanooga, TN (US); Rob Padgett, Chattanooga, TN (US); Randy Stanfield, Chattanooga, TN (US); Kevin Whiteside, Chattanooga, TN (US)

(73) Assignee: Tuftco Corporation, Chattanooga, TN (US)

( * ) Notice: Subject to any disclaimer, the term of this patent is extended or adjusted under 35 U.S.C. 154(b) by 277 days.

(21) Appl. No.: 17/314,898

(22) PCT Filed: Nov. 8, 2019

(86) PCT No.: PCT/US2019/060646
§ 371 (c)(1),
(2) Date: May 7, 2021

(87) PCT Pub. No.: WO2020/097583
PCT Pub. Date: May 14, 2020

(65) Prior Publication Data
US 2022/0356622 A1 Nov. 10, 2022

Related U.S. Application Data

(60) Provisional application No. 62/758,040, filed on Nov. 9, 2018.

(51) Int. Cl.
*D05C 15/26* (2006.01)
*G05B 15/02* (2006.01)
*G06F 3/147* (2006.01)

(52) U.S. Cl.
CPC ............. *D05C 15/26* (2013.01); *G05B 15/02* (2013.01); *G06F 3/147* (2013.01); *D05D 2205/18* (2013.01)

(58) Field of Classification Search
CPC .... D05C 15/26; D05C 15/34; D05D 2205/18; D05B 43/00; D05B 79/00
See application file for complete search history.

(56) References Cited

U.S. PATENT DOCUMENTS 3,875,883 A * 4/1975 Eberwein ............... B65H 57/12
112/475.08
5,012,564 A * 5/1991 Gironi ..................... D02H 1/00
28/193
5,058,518 A 10/1991 Card
(Continued)

FOREIGN PATENT DOCUMENTS

WO WO2017036701 3/2017

OTHER PUBLICATIONS

PCT/US2019/060646, International Search Report, p. 2, Section C, Documents Considered to Be Relevant.

*Primary Examiner* — Nathan E Durham
(74) *Attorney, Agent, or Firm* — Miller & Martin PLLC

(57) ABSTRACT

A communication system is provided for a yarn creel with sensors and displays located throughout the array of yarn positions and communicating with a creel controller to facilitate transfer and display of thread-up information and analysis of operational data.

19 Claims, 12 Drawing Sheets

(56) References Cited

U.S. PATENT DOCUMENTS

| | | | |
|---|---|---|---|
| 7,983,782 B2 * | 7/2011 | Nomura | B65H 49/04 |
| | | | 700/136 |
| 2011/0048304 A1 * | 3/2011 | Kato | D05B 91/16 |
| | | | 206/389 |
| 2011/0048305 A1 | 3/2011 | Christman, Jr. | |
| 2012/0137944 A1 | 6/2012 | Vaughan | |
| 2016/0069003 A1 | 3/2016 | Wovns | |

\* cited by examiner

CREEL WITH INTEGRATED YARN DELIVERY AND CONTROL SYSTEM

FIELD OF THE INVENTION

The present invention relates to the automation of tufting processes and particularly to the enhancement of yarn creel operations and designs optimized for use in the tufting industry.

BACKGROUND OF THE INVENTION

In prior years, human machine interfaces (HMIs) for tufting machines have been developed to facilitate operator control of the machine. Limited electronics have also been added to yarn creels that are used in connection with tufting machines, but yarn creels and tufting machines are not believed to have previously been able to share information, especially in near real time. Significant advantages may be realized through real time communications between yarn creels and the tufting machines that they supply yarns to, and also through providing creels with indicator, display, and sensor electronics.

BRIEF DESCRIPTION OF THE INVENTION

A novel system integrates a computer based tufting machine pattern processing system, with one or more of an electronic sensor based yarn break system, an adjustable pressure sensitive yarn tension system, a digital camera based vision system for carpet inspection or machine monitoring, location based manual switches, and a creel yarn location system with visible indicia. These interconnected items provide computerized control throughout the entire tufting process to improve machine performance, reduce the incidents of defective carpet products, and improve the productivity of the tufting machine operator and auxiliary support and management personnel. Management is facilitated because all of these networked items can supply data to a production monitoring system for summarization, analysis, and presentation.

In general, the integrated yarn delivery and control system sends, receives, stores, processes, and communicates critical information from the initial selection of the correct yarn cone location through to the output of a tufted fabric. The system is integrated into the yarn delivery creel and, dependent upon the user input tufting machine pattern file processed, visual cues may be presented in the form of illuminated lights or textual and graphic displays to indicate creel locations to position particular colors and sizes of yarn cones. Yarn cones are also referred to as yarn bobbins or yarn packages depending upon the particular circumstance. This allows a worker loading or maintaining the creel to quickly determine where to locate specific bobbins of yarn and reduces errors that create defective carpet products.

As the yarn moves through the yarn feeding system, yarn break sensors and automatically adjusted tight end detectors may stop the tufting machine and alert the operator to the specific zone or location of the problem yarn. The tight end detectors may have saved settings stored with the computerized tufted pattern file to facilitate rapid style changes. Defects in carpet patterning or color can be identified by the vision detection system located on the output side of the tufting machine to notify machine operators when it detects the color or pattern may be out of specification. Push buttons or manual switches located at yarn package positions may provide context-based operator information or audit data. Operator alerts may be a combination of one or more forms of visual notifications, audible notifications, or messages displayed on monitors or displays, or alerts communicated through mobile devices.

Finally, the integrated yarn delivery and control system can collect data throughout a tufting system and provide summary information and analysis to facilitate troubleshooting of machinery, raw materials, patterns, machine operators and other potential sources of variation and machine productivity.

When patterns are loaded into a tufting machine, the creels or beams must be preloaded with the proper amount of yarn that each needle will use through the course of sewing the product. A creel is simply a rack where a cone of yarn is positioned that will supply a yarn to a specified needle on the associated tufting machine. Generally, a cone of yarn must be mounted in the creel to correspond to each tufting machine needle being used to tuft a pattern, and thus may result in a relatively large and complex structure to feed yarns to typical ranges of 800 to even 2,000 individual needles. In addition to providing an array of locations for hundreds of yarn packages, a creel must direct these individual yarns out of the creel in a fashion that avoids entanglement, snags and breakage. Another yarn delivery mechanism is referred to as a beam. A beam is a large circular spool that has many strands of yarn wrapped around it. Each of these strands of yarn passing through a tufting machine needle sews a single vertical column of the pattern or in the case of shifting needles or backing fabric sewing a color in several adjacent or nearly adjacent columns of the pattern. It is common in the tufting industry to refer to these as axes, or an axis for a single needle.

In the case of each pattern, other than a simple solid color, it is necessary to position different packages of yarn on the creel or to wind different yarns on beams to feed the yarn to specific needles on the tufting machine. The present invention is primarily adapted for use with creels, but some elements of the invention may be practiced with yarns fed from beams as well.

When loading a creel with yarn, it is necessary to associate the yarn packages with needle positions on the tufting machine. In addition to variations in color in a pattern, it is also possible that there will be variations in the quantities of yarn consumed. Thus, for a heavily used yarn, it might be desired to use a three-pound cone or spool of yarn while a less prominently tufted yarn might be fed into the creel from a two-pound spool. It could even be desirable to be able to custom wind yarn spools to desired lengths necessary for short run patterns so that substantial quantities of yarn are not left remaining on spools mounted on the creel at the end of a production run. Accordingly, it is an object of the invention to provide a creel equipped with display capabilities access to pattern information that is available to the tufting machine. It is another object of the invention to enable near real time communication of data from the tufting machine to the controller enabled creel. It is a further object of the invention to provide a creel with the capability to display textual and graphic information at the mounting locations of yarn packages in a creel.

It is an additional objection of the invention to provide both real time and off line data for analysis in machine operation and optimization. Some or all of these objects may be realized by various embodiments of the invention.

DETAILED DESCRIPTION OF THE INVENTION

Figure 1A:
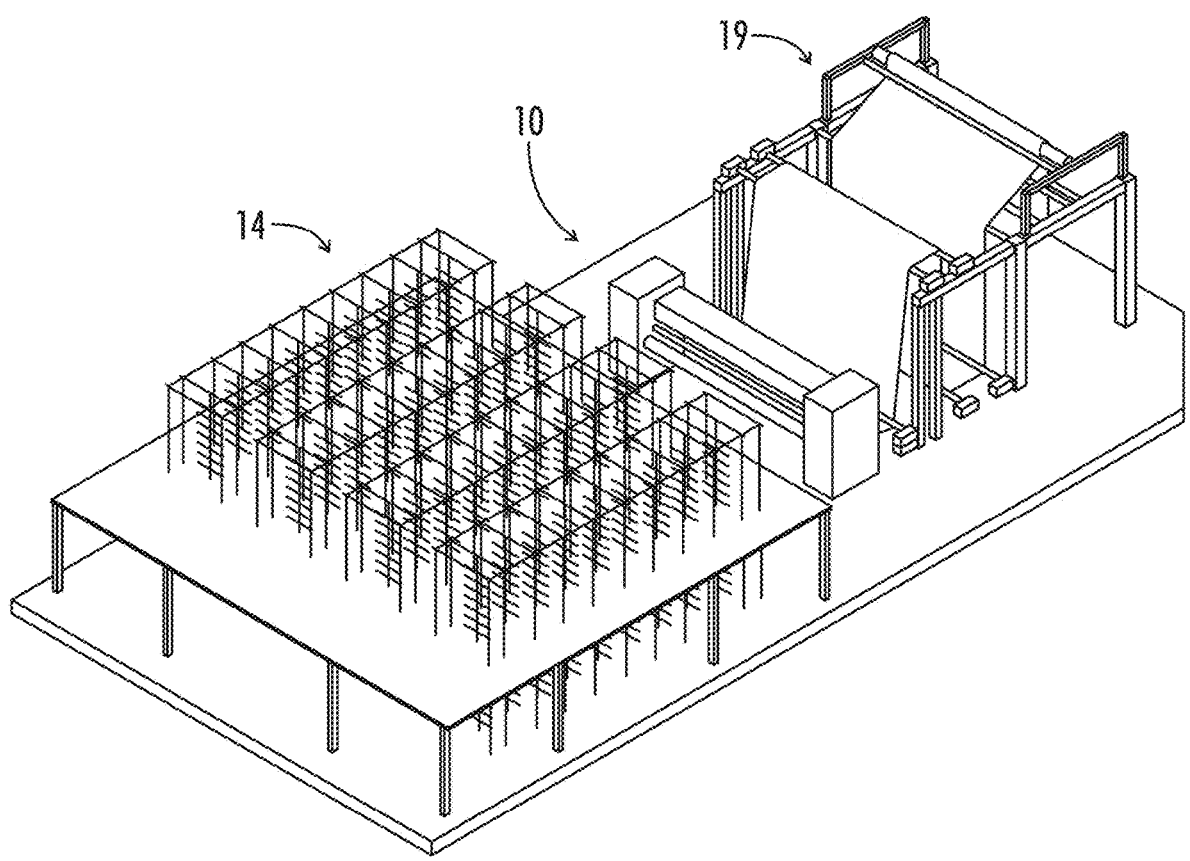
FIG. 1A is a perspective view of a tufting machine and creel.

Turning then to FIG. 1A, a generalized tufting machine 10 with take up rolls 19 for the tufted fabric and a two-story creel 14 to hold cones or spools of yarn is illustrated. It should be understood that aspects of the invention can be practiced on a wide variety of tufting machines, not simply the broadloom machine 10 depicted in FIG. 1A. Indeed, versions of the system can be implemented on most computer controlled tufting apparatus and sensor data can be captured and processed in an even wider variety of settings.

Figure 1B:
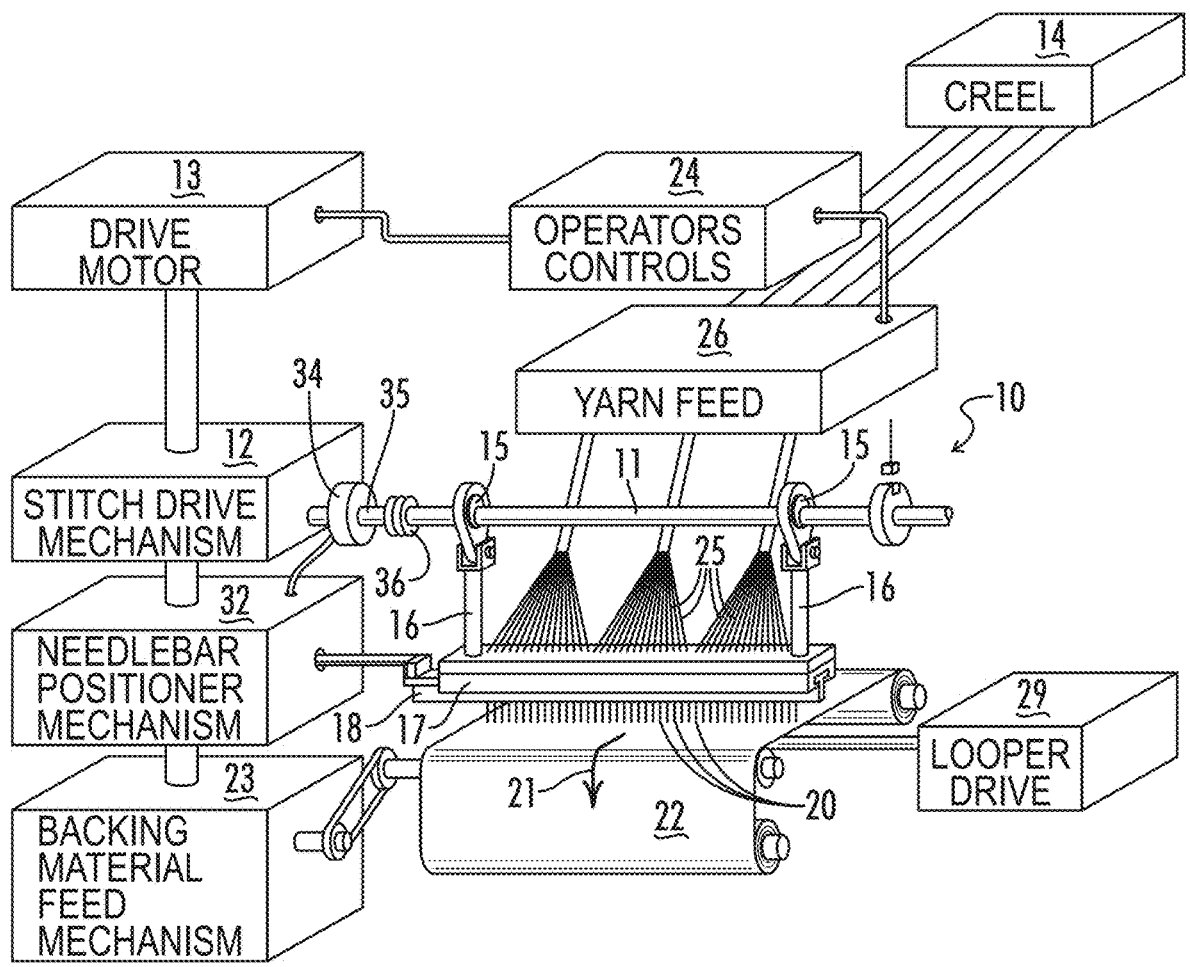
FIG. 1B is a simplified diagramic illustration of a tufting machine and creel showing operative components.

For explanatory purposes, the tufting machine 10 disclosed in FIG. 1B includes a rotary needle shaft or main drive shaft 11 driven by stitch drive mechanism 12 from a drive motor or other conventional means, rotary eccentric mechanism 15 mounted upon rotary needle shaft 11 is adapted to reciprocally move the vertical push rod 16 for vertically and reciprocally moving the needle bar slide holder 17 and needle bar 18. The needle bar 18 supports a plurality of uniformly spaced tufting needles 20 in a longitudinal row or staggered longitudinal rows, extending transversely of the feeding direction of the backing fabric or material 22. The backing fabric 22 is moved longitudinally in direction 21 through the tufting machine 10 by the backing fabric feed mechanism 23 and across the backing fabric support with needle plate and needle plate fingers.

Yarns 25 are fed from the creel 14 to the pattern control yarn feed 26 to the respective needles 20. As each needle 20 carries a yarn 25 through the backing fabric 22, a hook or looper is reciprocally driven by the looper drive 29 to cross each corresponding needle 20 and hold the corresponding yarn end 25 to form loops. Cut pile tufts may be formed by cutting the loops with knives: a cut/loop or level cut/loop (LCL) apparatus may also be employed, and may have its own controller, just as do the yarn feed, needle bar or backing shifter, and backing feed apparatus.

The needle bar shifting apparatus 32 is designed to laterally or transversely shift a needle bar 18 relative to the needle bar holder 17 a predetermined transverse distance, typically equal to the needle gauge or multiple of the needle gauge, and in either transverse direction from its normal central position, relative to the backing fabric 22, and for each stroke of the needles 20. In some configurations, more than one row of needles is mounted in a needle bar or alternatively multiple needle bars can be shifted in unison or independently. A jute or backing shifter may move the backing fabric laterally with respect to a transversely stationary needle bar, or simultaneously with one or more transversely shifting needle bars.

In order to generate input encoder signals for the needle bar shifting apparatus 32 corresponding to each stroke of the needles 20, an encoder 34 may be mounted upon a stub shaft 35, or in another suitable location, and communicate positional information from which a tufting machine controller can determine the position of the needles in the tufting cycle. Alternatively, drive motors may use commutators to indicate the motor positions from which the positions of the associated driven components may be extrapolated by the controller. As reflected schematically in FIG. 3, operator controls 24 also interface with the tufting machine controllers to provide necessary pattern information to the storage associated with the various tufting machine controllers before machine operation.

Figure 2:
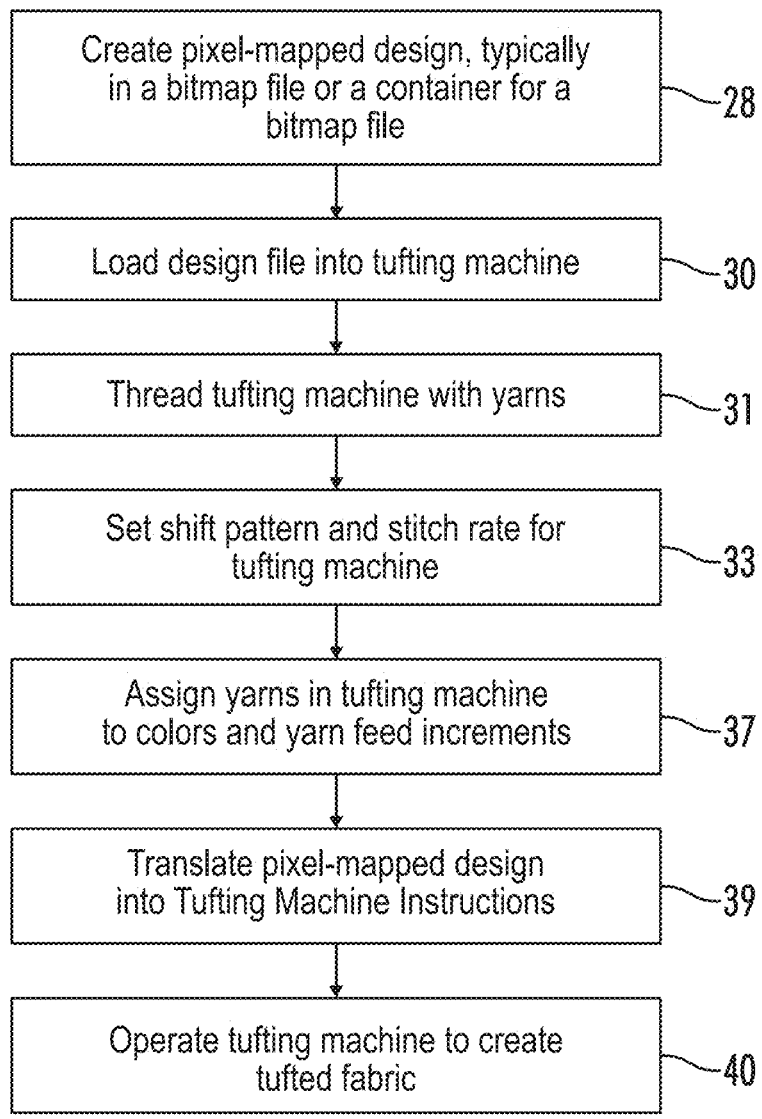
FIG. 2 is a flow diagram illustrating steps presently used in designing and manufacturing tufted fabric.

Turning then to FIG. 2, the first step in an existing process of designing and manufacturing tufted fabric is the creation of the graphic design to be tufted 28. The design can be created by an artist or adapted from a photograph or pre-existing image. In either case, the image should be created or processed to limit the color palate to a manageable number of yarn choices, preferably between two and twelve, and most commonly about two through six colors. Preferably this design process is executed on a design workstation running Texcelle or Tuftco Design software although sometimes automated design features can be included in the operator interface of a tufting machine.

The next step 30 is to load the pattern image or data into a tufting machine having a controller running an operator interface software such as the Tuftworks software suite of Tuftco Corp., and to process the pattern graphics to create machine instructions. These steps can be carried out using the operator controls 24 of modern tufting machines. The tufting machine should be threaded with appropriate yarns 31. When using the Tuftworks system, there are two principal steps prior to creating machine instructions. One step 33 (in FIG. 2) is to assign a shift pattern or step pattern to the needle bar 18 (shown in FIG. 1B) and a stitch rate to the pattern. In the case of a two-color pattern, it is quite practical to use a very simple stepping pattern of over and back so that the needle bar merely moves from dead center to a position offset by one gauge unit, and repeats.

The step of threading the tufting machine with yarns 31 requires associating the tufting machine with a yarn creel 14 or set of yarn beams. The yarn creel must be loaded so that the yarn corresponding to the first needle on the tufting machine is located to be fed to the appropriate side of the tufting machine. This requires that when loading the creel, the appropriate color, and possibly yarn spool size, is located in the position of the creel that feeds the first needle. In the yarn creel 14 depicted in FIG. 1A, different carpet mills might designate the position to feed to the first needle of the tufting machine at any of sixteen different locations, that being a top or bottom position, on the top or bottom floor of the creel, at any of the four corners of the creel. When aware of the creel locations that correspond to needle positions on an associated tufting machine then the pattern input and real time data available at the tufting machine operator position may be useful in working with the creel. So communicating the information from the tufting machine interface or controllers to be accessed by creel workers or technicians can be beneficial.

Prior art attempts to automate the creel loading process have principally included the PatternPerfect creeling system provided by Essex, Inc., including a controller mounted to the creel and which provides illuminated flashing lights. In the PatternPerfect system, an LED is associated with each spool position within the creel. The PatternPerfect process illuminates LEDs in a single color so that the color or color package of a particular type is loaded sequentially, and a six-color pattern would require six separate passes through the creel. In addition, the patterns must be specially configured to load into the controller to be utilized through the operator interface for the PatternPerfect system. This means that different information and files are used in the tufting machine and an associated PatternPerfect equipped creel.

It is sometimes useful to be able to load a pattern directly into an interface on a creel, so that a creel can be loaded while not communicating with an operating tufting machine. This is the case with mobile creels that are wheeled into position for use, or with tufting machines that are associated with multiple creels (or creel segments) so that manufacturing of one pattern and yarn loading for a different pattern can proceed simultaneously. Also, in the two-story creel 14 of FIG. 1, it would be possible to load one pattern in a specified creel section, such as the top floor, while feeding a separate pattern from a separate set of yarn packages, such as those loaded in the bottom floor. However, it is also desirable that the pattern loaded into the tufting machine operator interface be available to an associated creel.

Figure 3:
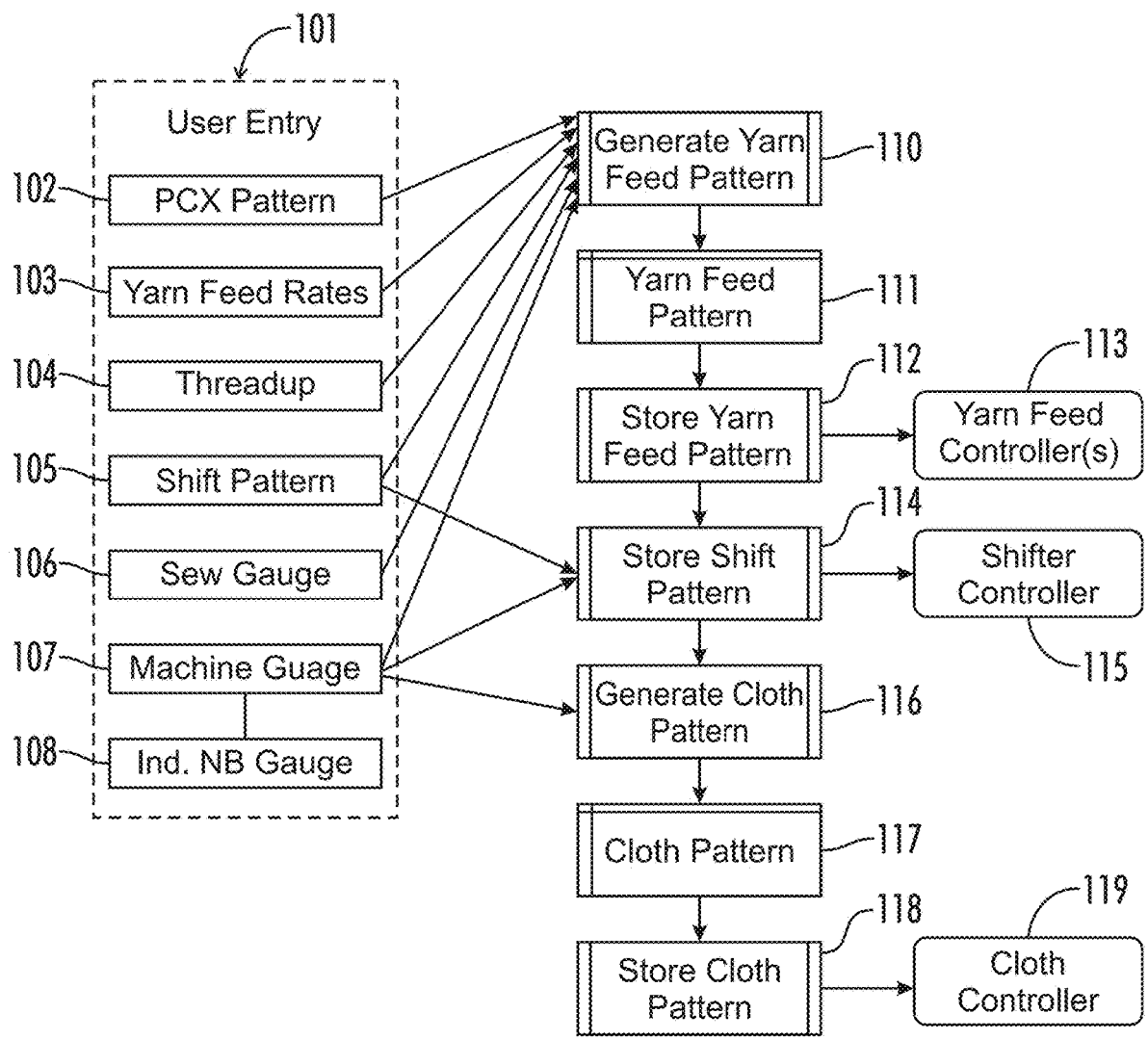
FIG. 3 is a schematic diagram illustrating the data inputs and processing to create pattern instructions for a tufting machine operable to produce fixed and variable gauge fabrics with a wide variety of pattern options.

FIG. 3 provides an overview of how the data input from the pattern file is combined with the operator inputs to create pattern information files that are transmitted from the operator interface computer to the tufting machine controllers for the appropriate axes of movement that cause the shifting, feeding, and reciprocation of parts that result in tufted fabrics. Specifically, it can be seen in FIG. 3 that at the operator interface 101, a PCX pattern file that graphically depicts an image to be tufted can be loaded 102. At the operator interface 101, the operator will enter yarn feed rates 103, the yarn thread up 104, the shift pattern 105, and gauge information for the machine and tufting style 106-108. With this information, the tufting machine generates, validates and stores the yarn feed pattern applicable to the various needles across the tufting machine 110-112 and this information is made available to the yarn feed controllers 113 to operate pattern control yarn feed device 26 (show in FIG. 1B). In addition, shift pattern information 105 is stored 114 and made available to shift controller, and cloth shifting and feeding information is generated and stored 116-118 and made available to cloth controller 119.

Figure 4A:
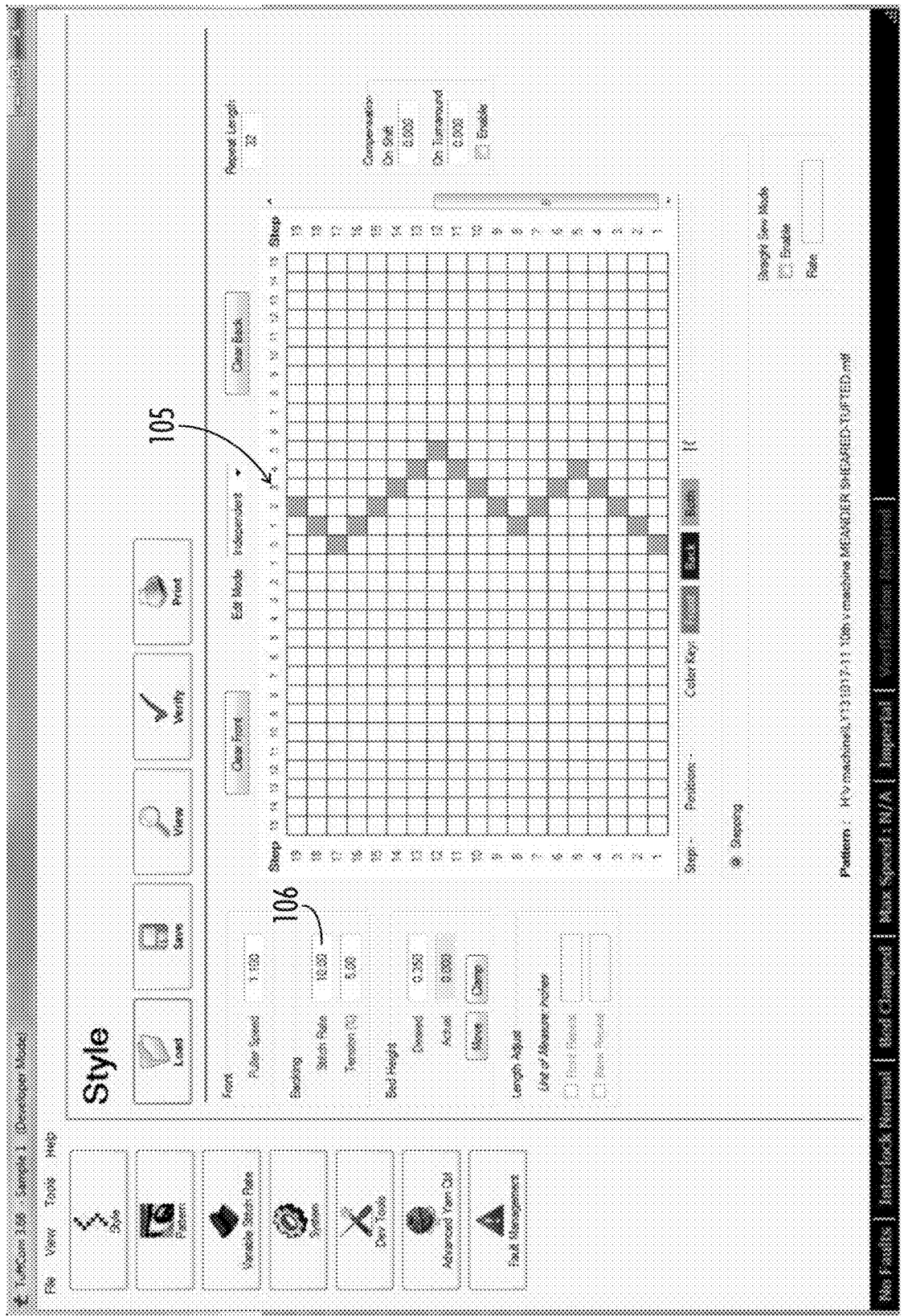
FIG. 4A is a tufting machine operator interface screen showing a shift pattern for two needle bars and basic tufting parameters.

FIG. 4A shows an operator interface screen for a tufting machine useful to create patterns involving yarn placement. Patterns can be created with one or two rows of needles. The operator can specify shift patterns for needle bars and for backing shifting. The illustrated shift pattern 105 shows both front and back needle bars shifting in unison four or more sequential steps in alternating directions. In this FIG. 4A, the stitch rate 106 is nominally set at 10 stitches per inch. However, the actual number of stitches per inch will be the specified 10 stitches per inch multiplied by the number of different yarns, and if tufted at a different rate from the $1/10^{th}$ gauge of the tufting machine by a factor to compensate for the varied stitch density desired at the non-machine gauge.

Figure 4B:
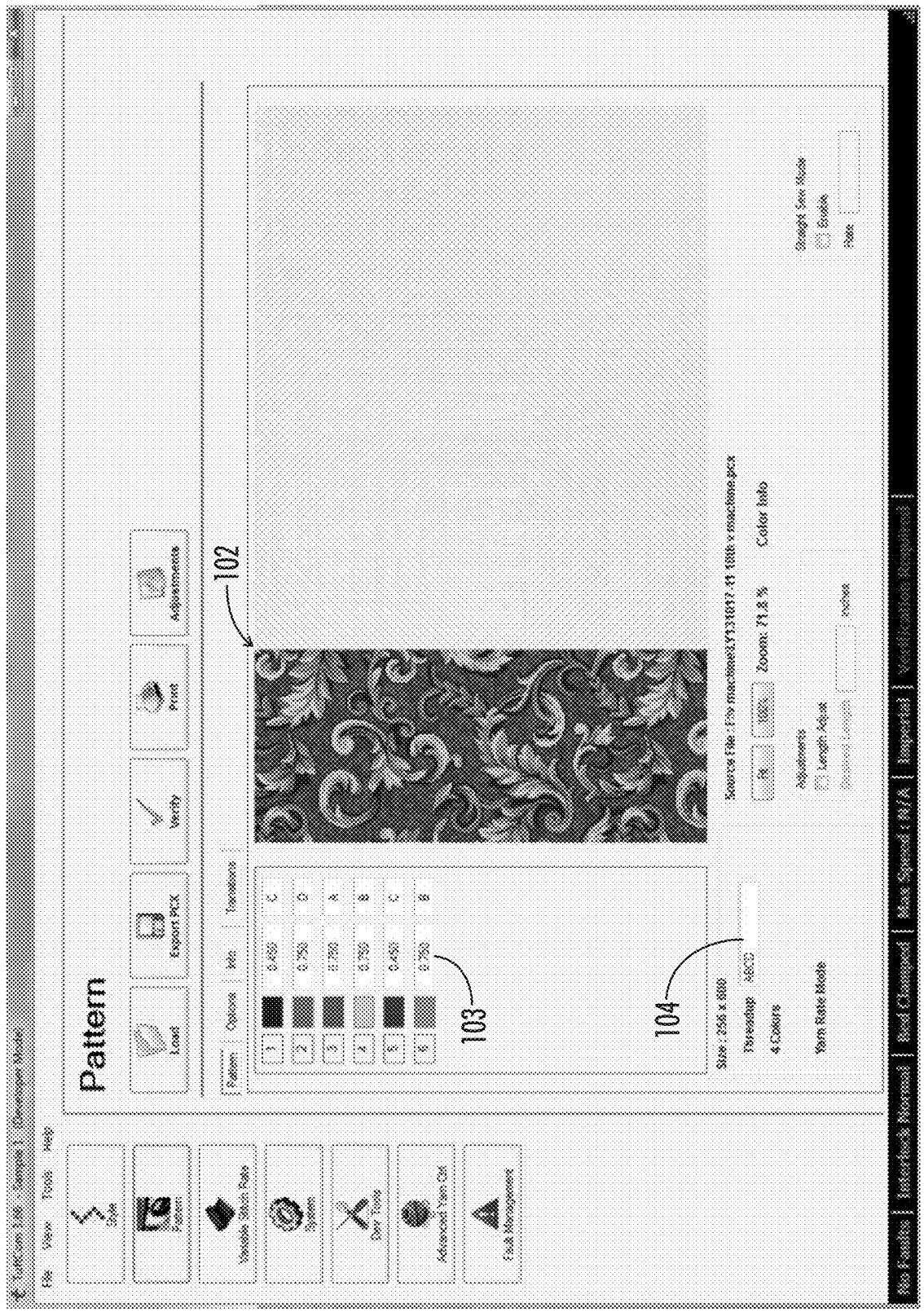
FIG. 4B is an operator interface screen from a tufting machine showing a four-color thread up (ABCD) for an exemplary pattern with basic color, yarn feed, and pattern information.

FIG. 4B shows an operator interface screen where the yarn thread up 104 is assigned to the pattern and yarn pile heights 103 assigned for different yarns and their appearance reflected in the graphic pattern image 102. Illustrated is a four-color (ABCD) thread up with high pile heights for each yarn and medium high pile heights for two of the yarns, resulting in six colors being available for the image display 102.

Figure 4C:
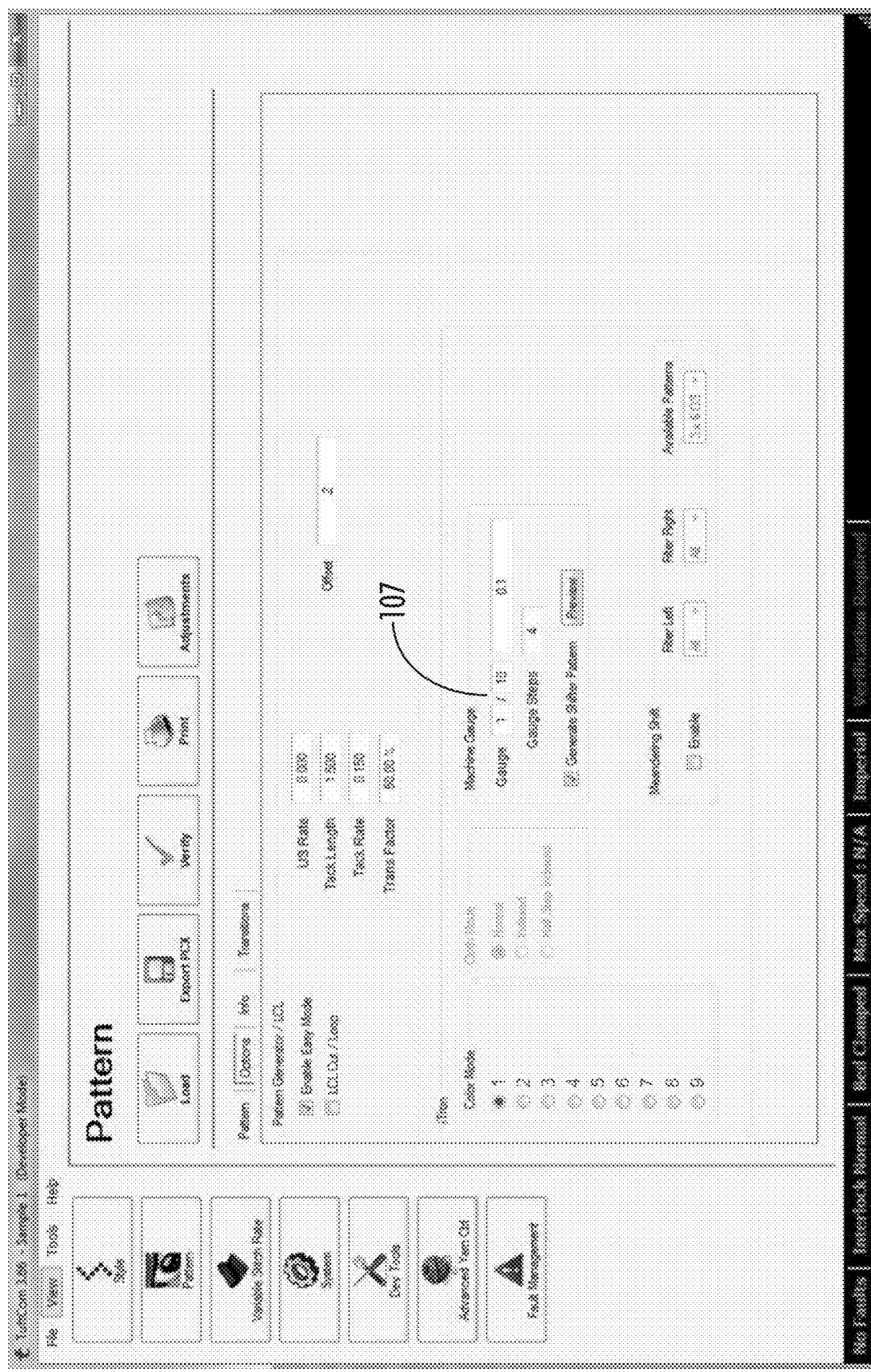
FIG. 4C is a tufting machine operator interface screen showing a variety of yarn feed parameters for a tufted pattern.

FIG. 4C shows an additional operator screen, with functionality combining that of a hollow needle tufting machine and a yarn placement machine. Generally, a two-needle bar or graphics machine will have an even color mode and a machine gauge 107 may be specified since a backing shifter allows for variable gauge. For yarn placement purposes, the yarn lengths for buried or pulled out stitches, as well as tacking stitches, is specified. The result of all of this pattern information is that relatively precise estimates of yarn consumption can be calculated and verified against resulting fabrics in production. In addition, yarn consumption can be estimated and verified in the midst of production, and with an enabled creel, appropriate information can be sent to the creel controller and displayed in the preferred fashion.

Figure 5:
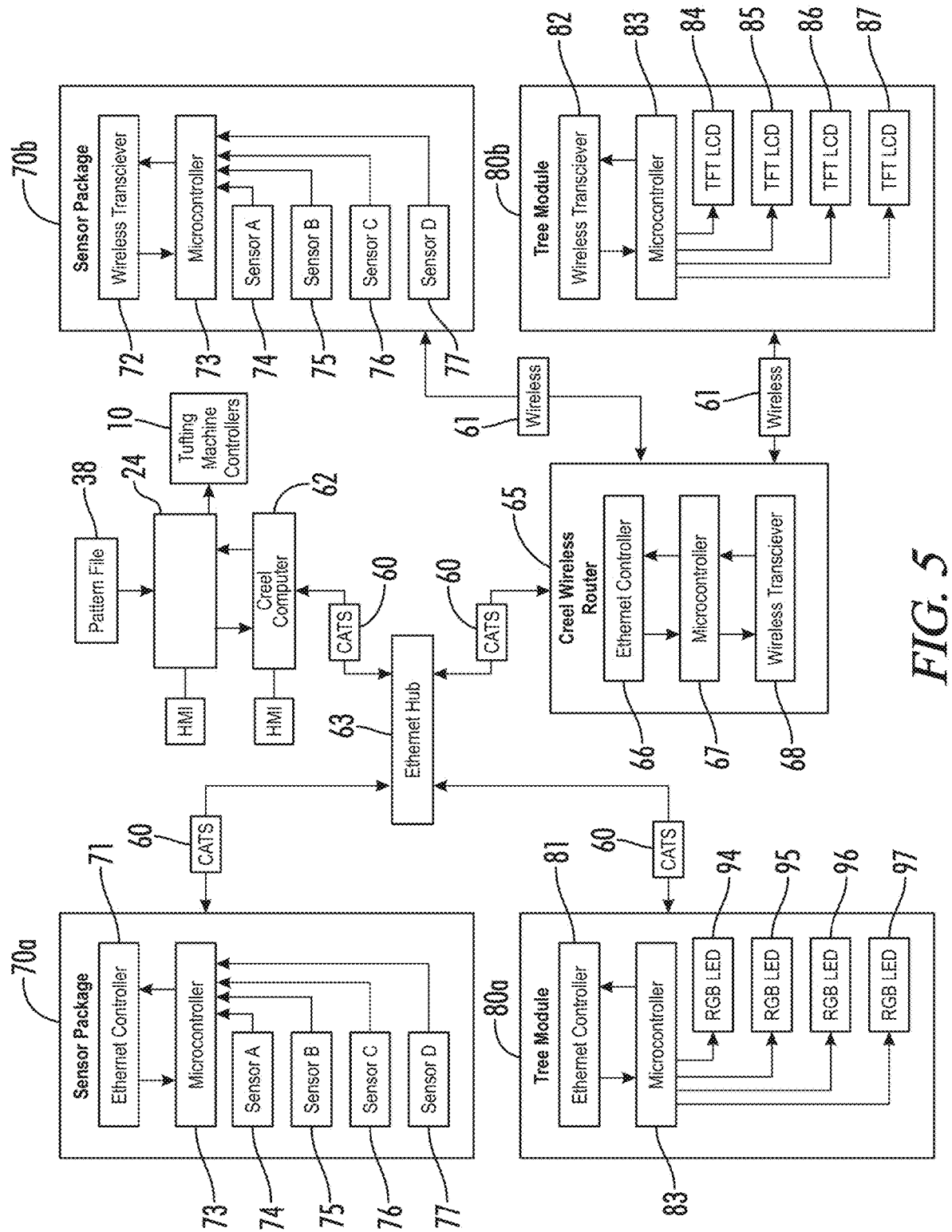
FIG. 5 is a schematic system hardware diagram for an exemplary display and sensor wired creel having a controller interfacing with either an operator interface or a controller of an associated tufting machine.

An exemplary overview of a creel interfacing with a tufting machines operational controls is shown in FIG. 5 where the computer 24 for the machine operator communicates with the controllers in the tufting machine 10 where the yarn feed pattern data, shift pattern data, backing feed instructional data, and cut/loop data information is fed. The software on this computer 24 with the operator interface (HMI) communicates with creel controller 62 that may also have an operator interface (HMI) and is in wired or wireless communication with sensors 70 and yarn illumination modules 80. The sensor 70 and display 80 technologies may be in separate units or combined in a composite unit. The display technology may be limited to an illuminating LED type device that can vary in color and intensity or even flashing, and may include a screen display that provides graphic or textual information, or may include both of these display aspects. In the illustrated embodiment, ethernet cabling 60 connects the creel operator interface controller 62 to an ethernet hub 63 which is in turn connected to wired sensor packages 70a containing an ethernet controller 71 communicating with a micro-controller 73 and multiple sensor devices 74-77. Multiple sensor packages 70a may be distributed across the creel due to the large number of yarn packages that may be mounted in a single creel. In addition, the ethernet hub 63 communicates with wired display modules 80a, also including ethernet controller 81 communicating with the micro-controller 83 and providing instructions to multi-color LED units. It is also possible to associate a wireless computer or tablet with the creel controller 62 to allow the use of creel functionality while traversing the many yarn package locations when working within a creel rather than being restricted to a fixed location.

Figure 6:
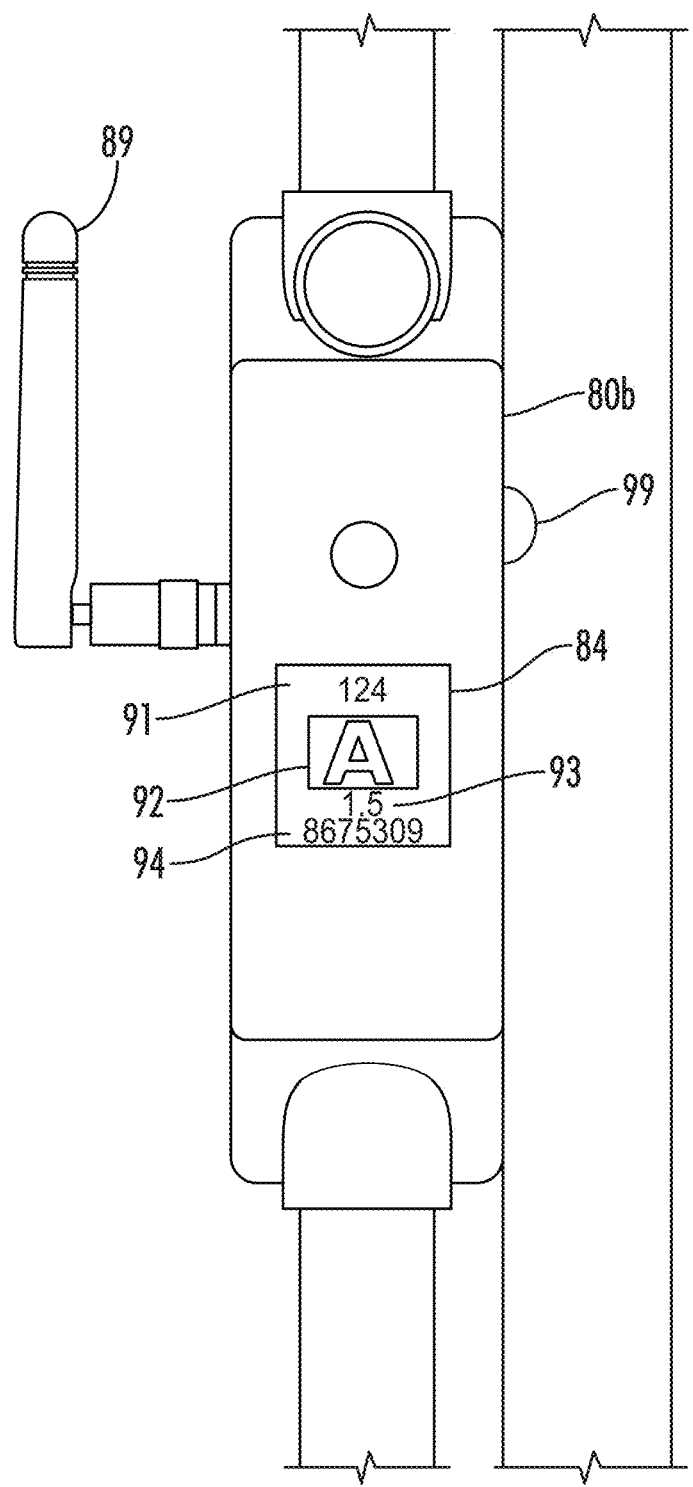
FIG. 6 is an illustration of an exemplary display module with a manual switch.
Figure 7:
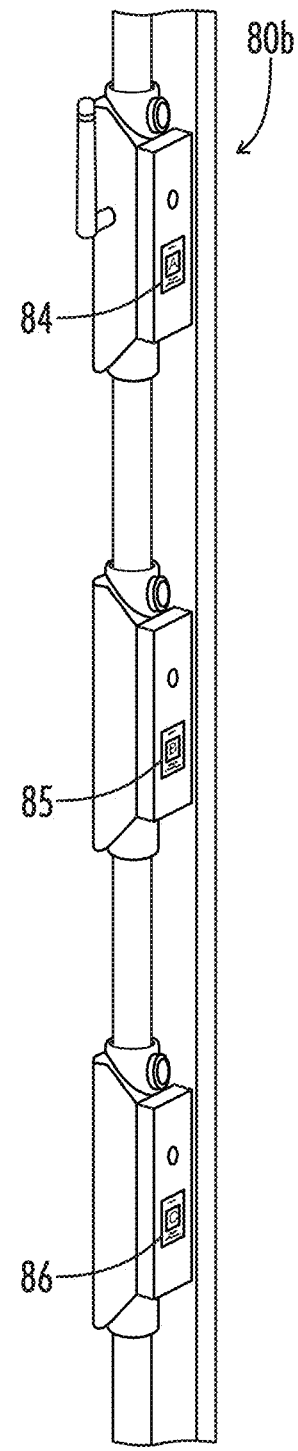
FIG. 7 is an illustration of several exemplary connected display modules.

In the wireless sensor/display version, the ethernet hub 63 is connected to a wireless router 65 with ethernet controller 66 communicating with micro-controller 67 and wireless transceiver 68 to provide wireless communication 61 to sensor package 70b with wireless transceiver 72 and with wireless display module 80b and with wireless transceiver 82 communicating with micro-controller 83. The illustrated wireless display module utilizes TFT displays such as depicted in FIG. 6 where the wireless display module 80b and first TFT display 84 are in a combined unit with wireless antenna 89. The TFT display 84 illustratively shows a needle position number 91, a yarn color designation 92, a yarn spool size 93, and a yarn dye lot 94. This displayed information may be varied according to the needs of a particular carpet producer to provide the most pertinent information to a creel worker or technician at any particular time in the creel loading or operating process. The yarn display module 80b may also include a sensor or sensor interface. In the illustrated embodiment of FIG. 6, a sensor in the form of a manual push button switch 99 is included. A creel technician or worker may depress the button 99 to send a contextual signal to the creel controller. FIG. 7 shows a wireless display module 80b in wired communication with displays 84, 85, and 86, with the top module on a tree or column of display/sensor components providing communication functionality for each component of the creel tree or post.

Figure 8:
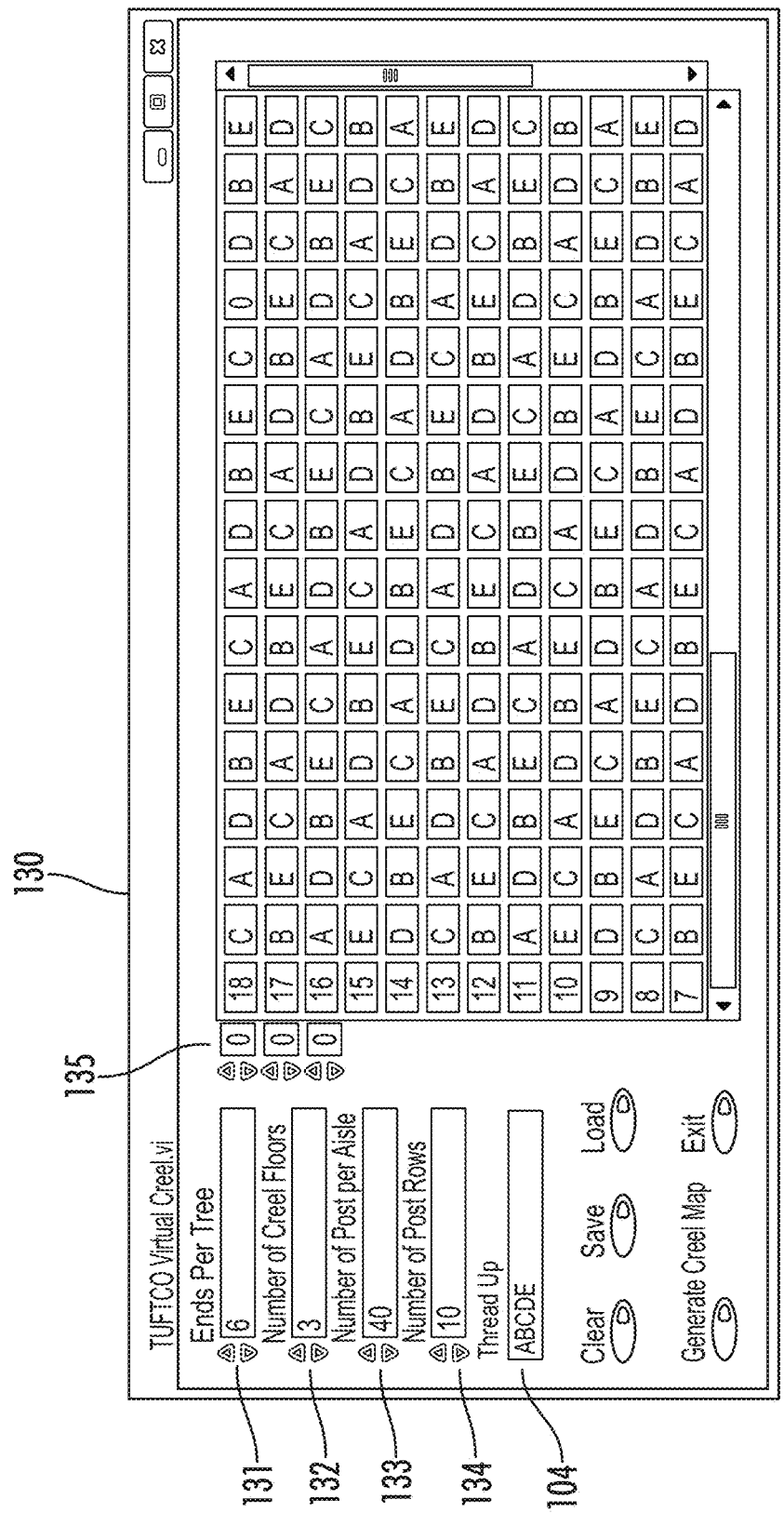
FIG. 8 is an exemplary screen display for the creation of a virtual creel.

FIG. 8 illustrates a virtual creel 130 utilized in the operator interface (HMI) available either at the creel 14 or at the operator controls 24 of the tufting machine. To create a virtual creel for a particular physical creel 14, it is necessary for the pattern interface to understand the association of yarn spool locations with needles on the tufting machine. The virtual creel maps to the actual the physical characteristics of the creel that should be included in the mapping algorithm. The illustrated HMI for a virtual creel supports the input of physical characteristics including the number of yarn ends per tree (or columns) of the creel 131, the number of floors of the creel 132, the number of posts per aisle on the creel 133 and the number of post rows 134 on the creel. With this information, and the knowledge of the location associated with the first needle (generally a top or bottom position at a corner of one of the floors of the creel) a virtual creel can be algorithmically determined. The numeric needle position to creel location sequence is assigned depending upon whether yarn ends increase from left to right, or front to back, or top to bottom within the creel. When the virtual creel is configured, the thread-up 104 is input or transferred from the tufting machine (FIG. 4B) and assigned to the virtual creel map.

Figure 9:
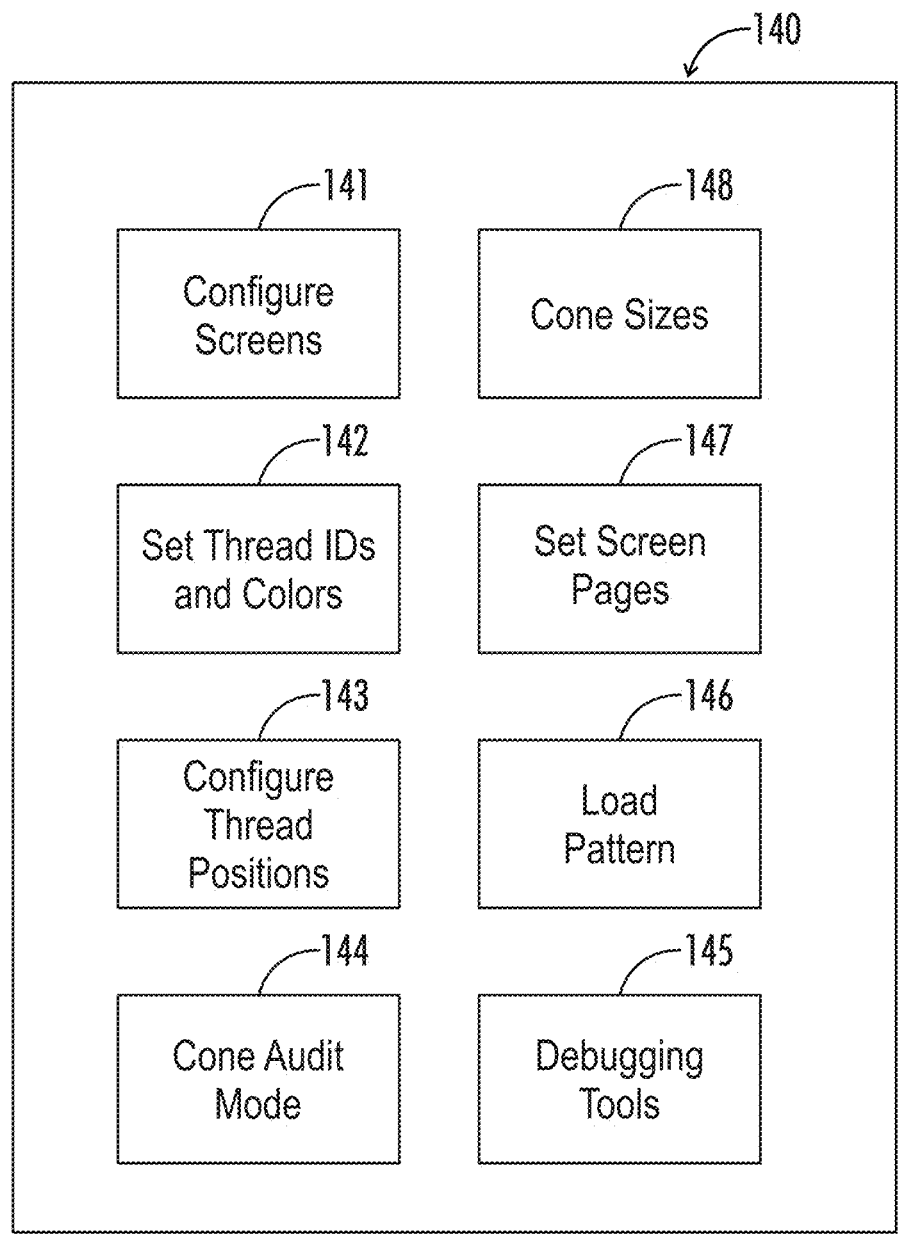
FIG. 9 is an exemplary creel operator screen with a variety of controller options for utilizing a display and sensor equipped creel.

In operation, after the virtual creel is in place, a pattern is loaded into the tufting machine as shown in Step 30 of FIG. 2 and then the entry of the thread-up causes the yarns to be assigned to various creel locations and the desired location information is illuminated or displayed while the creel is loaded. Alternatively, pattern or threadup information may be loaded directly to the creel controller. The creel controller may have operator interface 140 exemplified in FIG. 9 providing a variety of options to a creel technician. For instance, the technician may choose to configure screens 141, set thread IDs and colors 142, configure thread positions 143 as in the virtual creel of FIG. 8, enter an audit mode 144, enter applicable yarn cone sizes 148, set screen pages 147, directly load a pattern 146, or utilize debugging tools 145. Of particular note, setting screen pages allows a display unit within the creel to display more than one screen of information. This allows the display unit to cycle between multiple patterns or to cycle between pattern information, sensor information, or historical data.

Figure 10:
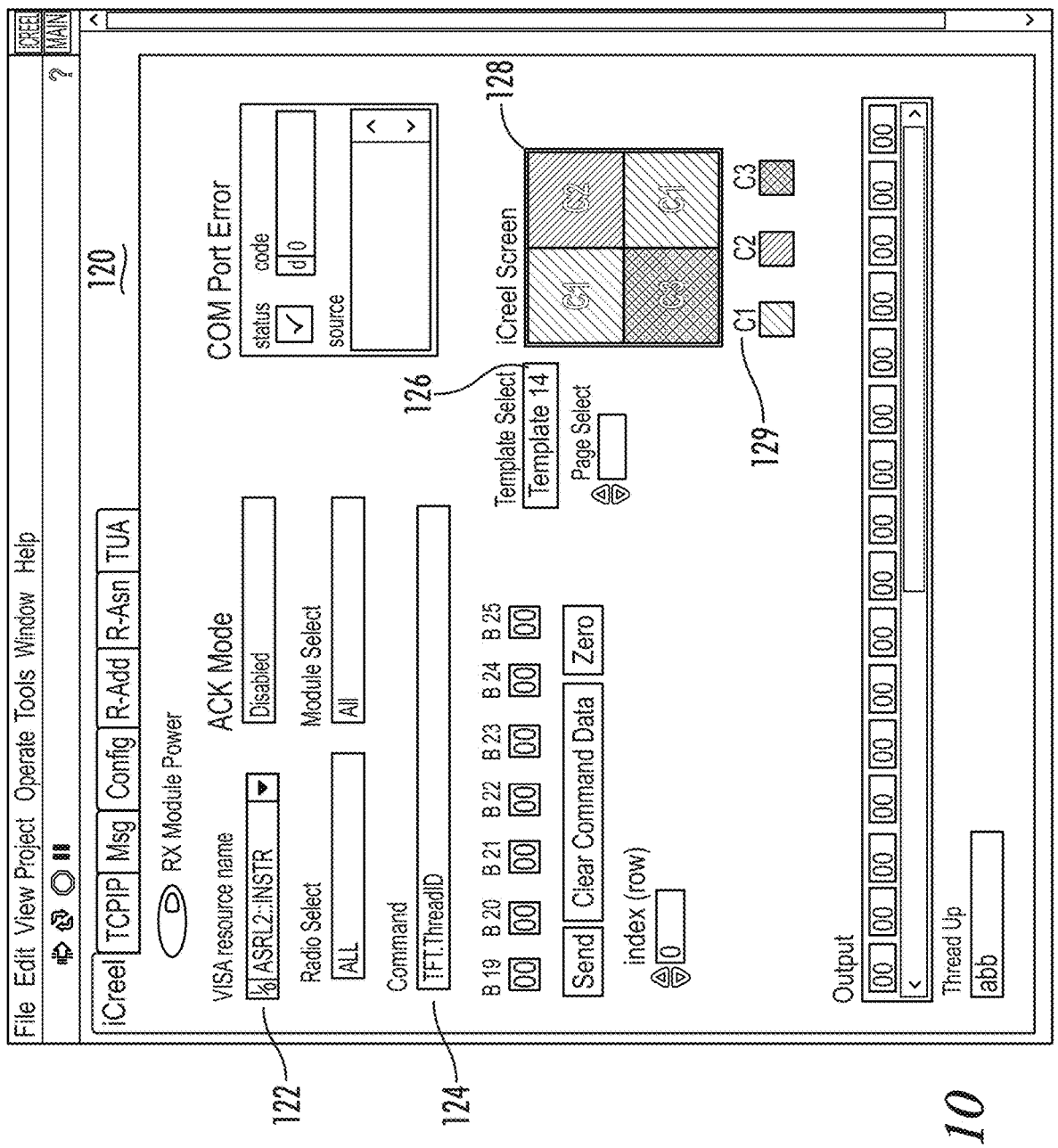
FIG. 10 is a creel operator screen display showing exemplary configuration options and templates available for use in creel and yarn management.

The audit mode 144 allows selected cones to be illuminated on a random or systematic basis for verification prior to feeding yarns from the creel into tufting machine. A mis-positioned yarn can lead to a considerable down time and waste. Providing audit functionality that can be tracked by use of push buttons 99 or by a technician or creel worker carrying a mobile operator interface, provides an opportunity to minimize these disruptions. FIG. 10 provides a configuration screen 120 allowing selection of communications network 122, selection of command instructions 124, selection of templates 126 that are optimized for various screen displays 128, and allows for a variety of color selections 129.

After configuration and loading pattern information, the sensor package or packages 70a and 70b in FIG. 3 are able to communicate various desired information to the operator controls at both the creel and the tufting machine. In addition, information may be communicated to creel display positions associated with particular yarn package locations. Similarly, information from the tufting machine, such as tight yarn signals near the pattern controlled yarn feed apparatus 26 can be communicated back to the creel controller and displayed at the creel HMI or by screen or LED at an associated yarn package position.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

What is claimed is:

1. A communication system for a creel for use in supplying yarns to a tufting machine and having an array of locations for mounting yarn packages comprising:
    a controller communicating with a plurality of sensors located proximate yarn mounting locations;
    said controller communicating with a plurality of displays located proximate yarn mounting locations;
    said controller accessing a virtual creel for mapping a yarn threadup for a pattern to yarn mounting locations; and
    an input for pattern information at least including a yarn threadup
    wherein the controller is in communication with the tufting machine during the tufting of the pattern.

2. The communication system of claim 1 wherein the sensors comprise manually operable switches.

3. The communication system of claim 1 wherein the displays comprise LEDs.

4. The communication system of claim 1 wherein the displays comprise screens capable of displaying text and graphics.

5. The creel of claim 4 wherein the display screens display a tufting needle position number.

6. The creel of claim 4 wherein the display screens display a yarn spool size.

7. The communication system of claim 1 further comprising an operator interface.

8. The communication system of claim 7 wherein an operator interface is viewable on a mobile device wirelessly connected to the controller.

9. The communication system of claim 1 wherein the controller communicates wirelessly with the plurality of displays.

10. The communication system of claim 1 wherein a plurality of modules located proximate yarn mounting locations include at least one of the plurality of sensors and at least one of the plurality of displays.

11. The creel of claim 1 wherein the virtual creel includes parameters for at least the number of yarn mounting locations per post, the number of posts per row, and the number of rows of posts.

12. The creel of claim 1 wherein during the tufting of the pattern the tufting machine communicates a yarn condition to the controller.

13. The creel of claim 1 wherein during the tufting of the pattern a sensor condition communicated to the controller is communicated to operator controls of the tufting machine.

14. A method for coordinating display and sensor information from a yarn creel with an operator interface of a tufting machine comprising the steps of:
inputting pattern information into the tufting machine;
extracting or generating yarn threadup information from the pattern information;
mapping the yarn threadup information to a plurality of yarn mounting locations in the creel;
communicating yarn threadup or mapping information from the tufting machine to the yarn creel;
activating displays located proximate selected yarn mounting locations;
mounting yarn packages at the selected yarn mounting locations proximate the activated displays; and
actuating sensors proximate the selected yarn mounting locations and communicating sensor information to the tufting machine.

15. The method of claim 14 wherein the sensors are manual switches.

16. A creel comprising:
an array of locations for mounting yarn packages;
a controller communicating with a plurality of screens capable of displaying graphic and textual information, being located proximate yarn mounting locations; and
an operator interface for specifying the graphic and textual information shown on the screens
wherein the controller is in communication with an associated tufting machine during tufting.

17. The creel of claim 16 further comprising a controller communicating with a plurality of sensors located proximate yarn mounting locations.

18. The creel of claim 16 wherein the operator interface is operable from either wired or wireless communication with the controller.

19. The creel of claim 16 wherein the operator interface provides for the use of parameters to map a virtual creel correlating yarn mounting positions in the creel to needle positions on an associated tufting machine.

* * * * *